United States Patent
Laursen et al.

[11] Patent Number: 6,077,459
[45] Date of Patent: Jun. 20, 2000

[54] PROCESS AND PROCESS UNIT FOR THE PREPARATION OF AMMONIA SYNTHESIS GAS

[75] Inventors: Carsten Lau Laursen, Charlottenlund; Henrik Otto Stahl, Rungsted Kyst, both of Denmark

[73] Assignee: Haldor Topsoe A/S, Lyngby, Denmark

[21] Appl. No.: 09/072,966

[22] Filed: May 5, 1998

[30] Foreign Application Priority Data

May 5, 1997 [DK] Denmark .................................. 0510/97

[51] Int. Cl.$^7$ ................................. C01B 3/26; F28D 7/10
[52] U.S. Cl. ......................... 252/376; 422/148; 422/200; 423/359; 423/652
[58] Field of Search ............................. 252/376; 422/148, 422/200; 423/359, 652

[56] References Cited

U.S. PATENT DOCUMENTS

| | | | |
|---|---|---|---|
| 4,822,521 | 4/1989 | Fuderer | 252/376 |
| 5,429,809 | 7/1995 | Stahl et al. | 422/202 |

*Primary Examiner*—Wayne Langel
*Attorney, Agent, or Firm*—Ostrolenk, Faber, Gerb & Soffen, LLP

[57] ABSTRACT

Process and process unit for the preparation of ammonia synthesis gas from a hydrocarbon feedstock comprising sequentially primary and secondary catalytic steam reforming of the feedstock in a primary heat exchange steam reformer and in a subsequent secondary reformer, wherein an effluent stream of primary steam reformed gas is heated by indirect heat exchange with a hot product effluent of secondary reformed gas prior to introduction of the primary steam reformed gas into the secondary reformer.

2 Claims, 1 Drawing Sheet

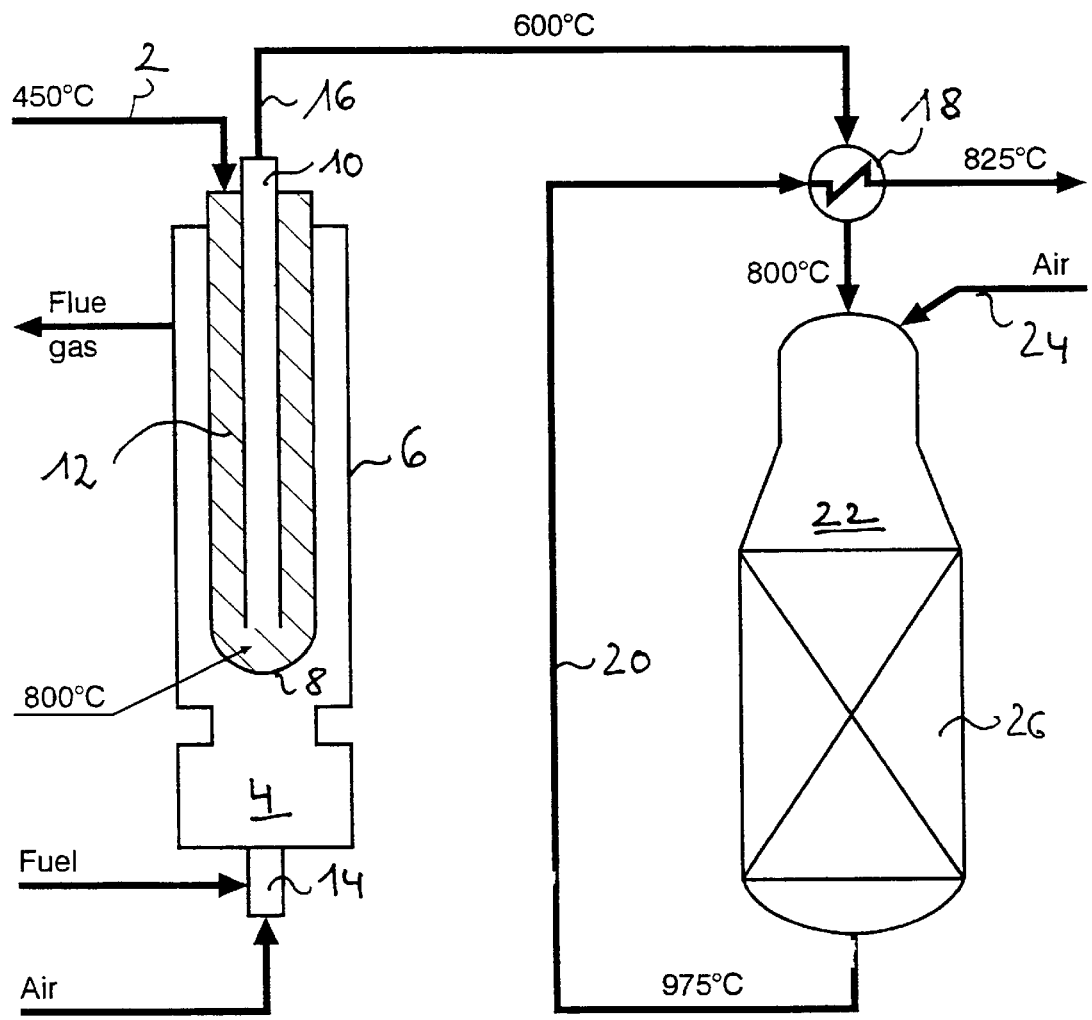
FIG.

PROCESS AND PROCESS UNIT FOR THE PREPARATION OF AMMONIA SYNTHESIS GAS

The present application is directed to the preparation of ammonia synthesis gas. More particular, the invention relates to a process and a process unit for the preparation of such gas comprising a sequence of primary and secondary steam reforming of a hydrocarbon feedstock in a heat exchange primary steam reformer and a subsequent adiabatic reformer.

Ammonia synthesis gas is conventionally prepared by subjecting hydrocarbon feed of natural gas or higher hydrocarbons to endothermic steam reforming reactions in a fired tubular steam reformer by contact with a steam reforming catalyst. The primary reformed gas is then fed into a secondary adiabatic reformer, wherein part of hydrogen and residual amounts of hydyrocarbons in the gas are partial oxidized with air or oxygen enriched air in presence of a secondary reforming catalyst. From the secondary reformer, raw ammonia synthesis gas containing hydrogen, carbon monoxide and carbon dioxide formed during reaction of the feedstock in the above steam reforming reactions and nitrogen introduced into the gas through addition of air in the secondary reforming step.

Necessary heat for the primary endothermic steam reforming reactions is usually supplied by combustion of fuel in flue gas side of the primary steam reformer, in which the catalyst is arranged in vertically tubes extending through the reformer. To reduce the fired duty and consumption of fuel in the primary reformer, it has also been suggested to supply a part of the heat by utilizing an effluent stream of steam reformed gas as a source of heat. Such a process and reactor are mentioned in U.S. Pat. No. 5,429,809, wherein heat is supplied partly by hot flue gas from burning of fuel and partly by a hot product effluent in a bayonet tube heat exchange reactor.

The general object of this invention is further to reduce the fired duty and fuel consumption in sequence of primary heat exchange steam reforming and secondary reforming for the preparation of ammonia synthesis gas from a hydrocarbon feedstock.

In accordance therewith, an object of the invention is to provide a process for the preparation of ammonia synthesis gas from a hydrocarbon feedstock comprising the steps of sequentially primary and secondary catalytic steam reforming of the feedstock in a primary heat exchange steam reformer and in a subsequent secondary reformer, wherein an effluent stream of primary steam reformed gas is heated by indirect heat exchange with a hot product effluent of secondary reformed gas prior to introduction of the primary steam reformed gas into the secondary reformer.

A further object of the invention is to provide a process unit for use in the above steam reforming process. The process unit, thus, comprises a primary heat exchange steam reformer connected to a secondary steam reformer and a feed/effluent heat exchanger arranged upstream to the secondary steam reformer, so that an effluent stream of steam reformed hydrocarbon feedstock from the primary heat exchange steam reformer is heated by indirect heat exchange with hot product effluent from the secondary steam reformer.

The term "heat exchange steam reformer" as used herein before and in the following description refers to a steam reformer where necessary heat for the primary steel reforming reaction occurring in a fixed bed of primary steam reforming catalyst is provided partly by a hot combustion gas and by heat contained in the primary reformed gas by passing both gases in heat exchanging relationship with the catalyst bed through the reformer. In such a reformer, heat in the reformed gas is recovered from a reforming temperature of typically about 800° C. to a lower level of typically about 600° C. outlet temperature.

The equilibrium temperature at inlet to the secondary steam reforming step is the temperature the primary reformed gas at outlet of the primary steam reforming catalyst bed, typically the above 800° C.

When using heat exchange primary steam reformers in a sequence of primary and secondary steam reforming without preheating the primary reformed gas, the temperature of primary reformed gas at inlet to the secondary reformer is, however, lower because of the indirect heat exchange with the process gas in the primary reformer. This results in a lower feed conversion in the secondary steam reforming step.

In order to obtain the desired stoichiometric composition of the secondary reformed raw ammonia synthesis gas and a low hydrocarbon content in the gas as required in the subsequent ammonia synthesis process, the equilibrium temperature of the primary reformed gas in a sequence of primary heat exchange and secondary reforming without preheating the primary reformed gas has to be higher to compensate for the lower hydrocarbon feed conversion in the secondary reforming step.

By the inventive combination of a secondary reformer and feed/effluent heat exchanger, the temperature of the primary steam reformed gas having been cooled below the equilibrium temperature in the heat exchange reformer is elevated to the reaction temperature as required in the secondary reformer through indirect heat exchange with the hot product effluent from the secondary reformer. Thereby, fuel consumption in the primary reformer is advantageously reduced by recovering excess of heat in the secondary steam reformed gas in the heat/effluent heat exchanger. Compared to a conventional primary-secondary steam reforming, this results in a correspondingly lower exit temperature of the produced raw ammonia synthesis gas from the steam reforming section.

The lower exit temperature from the reforming section and the reduced fuel consumption in the primary reformer, result in an overall improvement of consumption figures in the reformer section.

The invention will be described in more detail in the following description by reference to the drawings in which the sole Figure shows a simplified flow diagram of a process according to a specific embodiment of the invention.

When operating the process according to a specific embodiment of the invention, feedgas 2 of e.g. natural gas and steam is introduced into a primary heat exchange reforming reactor 4 at a temperature of 450° C. Reactor 4 is a conventionally designed bayonet tube reactor comprising within a pressure shell 6 one or more reactor tubes consisting of an outer sheet tube 8 closed at its outlet end and concentrically surrounding an inner open ended heat exchanging bayonet tube 10.

A space between tube 8 and 10 is filled with primary reforming catalyst 12.

Feed 2 passing through outer tube 8 and catalyst 12 is primary steam reformed by contact with catalyst 12. Necessary heat for the endothermic steam reforming reactions proceeding on catalyst 12 is supplied by hot flue gas obtained by burning fuel in a bottom burner 14 on passing hot flue gas along the wall of outer tube 8 in heat conducting relationship with the reacting feed in tube 8.

Supplemental heat is supplied by hot primary reformed effluent gas 16 from catalyst 12 leaving the catalyst at an outlet temperature of 800° C. and passing through inner tube 10 in heat conducting relationship with the reacting feed gas in catalyst 12.

The temperature of the primary reformed gas 16 decreases thereby to 600° C.

Gas 16 is then passed to feed/effluent heat exchanger 18, wherein the temperature of gas 16 is raised to 800° C. by indirect heat exchange with hot secondary reformed gas 20 being withdrawn from secondary reformer 22 at a temperature of 975° C. Secondary reformer 22 is a conventionally designed adiabatic reformer, wherein the reheated primary reformed gas 16 is partially oxidized with air 24 in top portion of the reactor and subsequently secondary reformed by contact with a secondary reforming catalyst arranged as fixed bed 26 in bottom portion of reactor 22. Secondary reformed gas 20 is withdrawn at bottom of the reactor at a temperature of 975° C. and cooled to 825° C. by indirect heat exchange as described above.

What is claimed is:

1. Process for the preparation of ammonia synthesis gas from a hydrocarbon feedstock comprising the steps of sequentially performing primary and secondary catalytic steam reforming of the feedstock, wherein the primary steam reforming is conducted in a primary heat exchange steam reformer to provide a hot primary reformed gas, and supplemental heat is supplied by said hot primary reformed gas by passing the hot primary reformed gas in heat conducting relationship with the reacting feed gas in the primary steam reformer, and further, wherein the effluent stream of primary steam reformed gas is heated by indirect heat exchange with a hot product effluent of secondary reformed gas prior to introduction of the primary steam reformed gas into the secondary reformer.

2. Apparatus for the preparation of ammonia synthesis gas from a hydrocarbon feedstock comprising a primary heat exchange steam reformer connected in series to a secondary reformer reformer, means for supplying supplemental heat by hot primary reformed gas from said primary steam reformer by passing the hot primary reformed gas in heat conducting relationship with the reacting feed gas in the primary steam reformer, and means for subsequently heating the effluent stream of steam reformed hydrocarbon feedstock from the primary heat exchange steam reformer by indirect heat exchange with hot product effluent from the secondary steam reformer, said means for heating comprising a feed/effluent heat exchanger arranged upstream of the secondary steam reformer.

* * * * *